US011903006B2

(12) United States Patent
Min et al.

(10) Patent No.: US 11,903,006 B2
(45) Date of Patent: *Feb. 13, 2024

(54) APPARATUS, SYSTEM AND METHOD OF CONFIGURING AN UPLINK TRANSMISSION IN A TRIGGER-BASED MULTI-USER UPLINK TRANSMISSION

(71) Applicant: INTEL CORPORATION, Santa Clara, CA (US)

(72) Inventors: Alexander W. Min, Portland, OR (US); Arik Klein, Givaat Shmuel (IL); Rath Vannithamby, Portland, OR (US); Ziv Avital, Kadima (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/460,912

(22) Filed: Aug. 30, 2021

(65) Prior Publication Data

US 2022/0061062 A1 Feb. 24, 2022

Related U.S. Application Data

(63) Continuation of application No. 16/583,606, filed on Sep. 26, 2019, now Pat. No. 11,109,393.

(51) Int. Cl.
*H04W 4/00* (2018.01)
*H04W 72/54* (2023.01)
(Continued)

(52) U.S. Cl.
CPC ....... *H04W 72/54* (2023.01); *H04W 72/1268* (2013.01); *H04W 88/08* (2013.01)

(58) Field of Classification Search
CPC . H04W 72/54; H04W 72/1268; H04W 88/08; H04W 84/02; H04W 28/04; H04W 72/04; H04W 72/042; H04L 5/0007
See application file for complete search history.

(56) References Cited

U.S. PATENT DOCUMENTS

| 11,109,393 B2 * | 8/2021 | Min ................... H04W 72/1268 |
| 2016/0113034 A1 * | 4/2016 | Seok ...................... H04W 74/04 |
| | | 370/329 |

(Continued)

OTHER PUBLICATIONS

IEEE Std 802.11™—2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.

(Continued)

*Primary Examiner* — Phuongchau Ba Nguyen
(74) *Attorney, Agent, or Firm* — Shichrur & Co.

(57) ABSTRACT

For example, a wireless communication device may be configured to determine an expected interference-based value corresponding to an Uplink (UL) transmission from a wireless communication station (STA) in a Trigger-Based (TB) Multi-User (MU) UL transmission to be communicated from a plurality of STAs to the wireless communication device; to determine one or more transmit (Tx) configuration parameters for the STA based on the expected interference-based value corresponding to the UL transmission from the STA; and to transmit a trigger frame to trigger the TB MU UL transmission, the trigger frame including the one or more Tx configuration parameters to configure the UL transmission from the STA.

20 Claims, 8 Drawing Sheets

(51) Int. Cl.
   *H04W 72/1268*   (2023.01)
   *H04W 88/08*     (2009.01)

(56) References Cited

U.S. PATENT DOCUMENTS

| | | | |
|---|---|---|---|
| 2016/0302229 A1* | 10/2016 | Hedayat | H04L 69/324 |
| 2016/0345349 A1* | 11/2016 | Ferdowsi | H04W 72/1268 |
| 2016/0360509 A1* | 12/2016 | Seok | H04L 1/16 |
| 2017/0171878 A1* | 6/2017 | Chun | H04W 72/0453 |
| 2017/0223665 A1* | 8/2017 | Chun | H04B 7/0695 |
| 2018/0262315 A1* | 9/2018 | Chun | H04L 5/00 |
| 2018/0332627 A1* | 11/2018 | Chitrakar | H04W 28/0278 |
| 2018/0376486 A1 | 12/2018 | Ahn et al. | |
| 2019/0090200 A1 | 3/2019 | Alpert et al. | |
| 2020/0053753 A1 | 2/2020 | Tanaka et al. | |
| 2021/0029722 A1* | 1/2021 | Ahn | H04W 74/04 |

OTHER PUBLICATIONS

IEEE P802.11ax/D4.0 Draft Standard for Information technology—Tele-communications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN, Feb. 2019, 746 pages.

Office Action for U.S. Appl. No. 16/583,606, dated Nov. 27, 2020, 22 pages.

Notice of Allowance for U.S. Appl. No. 16/583,606, dated Apr. 28, 2021, 15 Pages.

\* cited by examiner

APPARATUS, SYSTEM AND METHOD OF CONFIGURING AN UPLINK TRANSMISSION IN A TRIGGER-BASED MULTI-USER UPLINK TRANSMISSION

TECHNICAL FIELD

Embodiments described herein generally relate to configuring an uplink transmission in a trigger-based multi-user uplink transmission.

BACKGROUND

An Access Point (AP) and a plurality of wireless communication devices may be configured to implement Trigger-Based (TB) Multi-User (MU) Uplink (UL) physical layer convergence protocol (PLCP) Protocol Data Unit) PPDU (transmissions.

The TB MU UL PPDU transmissions may be initiated by the AP, which may solicit simultaneous UL transmissions from the plurality of wireless communication devices, for example, by sending a trigger frame.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
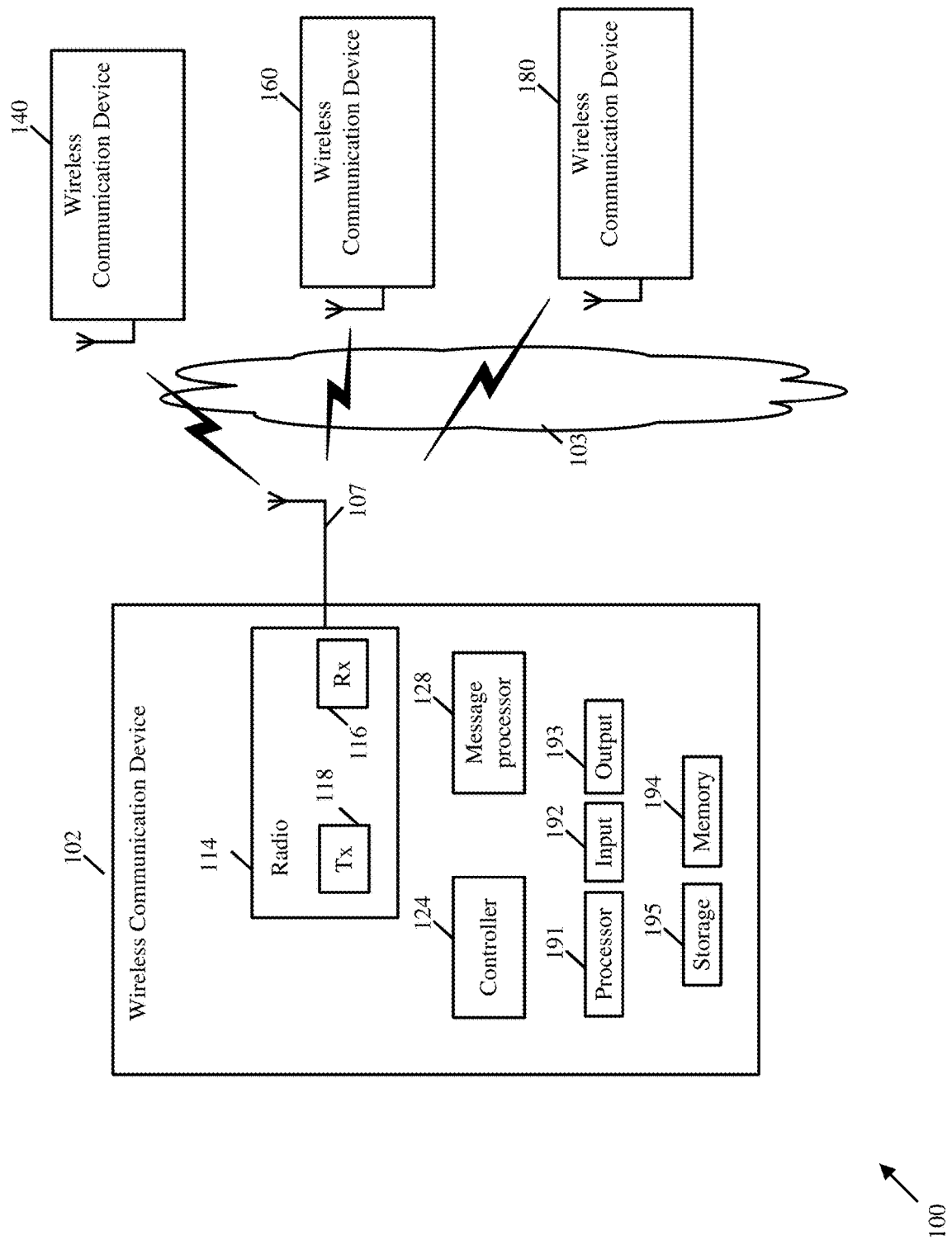
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016 (*IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications*, Dec. 7, 2016), and IEEE 802.11ax (*IEEE P802.11ax/D4.0 Draft Standard for Information technology-Tele-communications and information exchange between systems Local*

*and metropolitan area networks—Specific requirements, Part 11: Wireless LAN Medium Access Control (MAC) and Physical Layer (PHY) Specifications, Amendment 1: Enhancements for High Efficiency WLAN*, February, 2019)), and/or future versions and/or derivatives thereof, devices and/or networks operating in accordance with existing WFA Peer-to-Peer (P2P) specifications (including Wi-Fi P2P technical specification, version 1.5, Aug. 4, 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a Wi-Fi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz or 5 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a Wi-Fi Direct (WFD) communication, e.g., a WFD Peer to Peer (P2P) communication, wireless communication over a direct link within a Quality of Service (QoS) basic service set (BSS), a tunneled direct-link setup (TDLS) link, a STA-to-STA communication in an independent basic service set (IBSS), or the like.

Some demonstrative embodiments are described herein with respect to Wi-Fi communication. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102, 140, 160 and/or 180.

In some demonstrative embodiments, wireless communication devices 102, 140, 160 and/or 180 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, devices 102, 140, 160 and/or 180 may include, operate as, and/or perform the functionality of one or more STAs. For example, devices 102, 140, 160 and/or 180 may include at least one STA.

In some demonstrative embodiments, devices 102, 140, 160 and/or 180 may include, operate as, and/or perform the functionality of one or more WLAN STAs.

In some demonstrative embodiments, devices 102, 140, 160 and/or 180 may include, operate as, and/or perform the functionality of one or more Wi-Fi STAs.

In some demonstrative embodiments, devices 102, 140, 160 and/or 180 may include, operate as, and/or perform the functionality of one or more BT devices.

In some demonstrative embodiments, devices 102, 140, 160 and/or 180 may include, operate as, and/or perform the functionality of one or more Neighbor Awareness Networking (NAN) STAs.

In some demonstrative embodiments, one or more of wireless communication devices 102, 140, 160 and/or 180, e.g., devices 102, may include, operate as, and/or perform the functionality of an Access Point (AP) STA.

For example, the AP may include a router, a PC, a server, a Hot-Spot and/or the like.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In some demonstrative embodiments, device 102 may include, for example, one or more of a processor 191, an input unit 192, an output unit 193, a memory unit 194, and/or a storage unit 195. Device 102 may optionally include other suitable hardware components and/or software components. In some demonstrative embodiments, some or all of the components of one or more of device 102 may be enclosed in a common housing or packaging, and may be interconnected or operably associated using one or more wired or wireless links. In other embodiments, components of one or more of device 102 may be distributed among multiple or separate devices.

In some demonstrative embodiments, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

In some demonstrative embodiments, input unit 192 may include, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102.

In some demonstrative embodiments, wireless communication devices 102, 140, 160 and/or 180 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a Wi-Fi channel, an IR channel, a Bluetooth (BT) channel, and the like.

In some demonstrative embodiments, wireless communication medium 103 may include a wireless communication channel over a 2.4 Gigahertz (GHz) frequency band, or a 5 GHz frequency band, a millimeterWave (mmWave) frequency band, e.g., a 60 GHz frequency band, a Sub-1 GHz (S1G) band, and/or any other frequency band.

In some demonstrative embodiments, devices 102, 140, 160 and/or 180 may include one or more radios including circuitry and/or logic to perform wireless communication between devices 102, 140, 160 and/or 180, and/or one or more other wireless communication devices. For example, device 102 may include a radio 114.

In some demonstrative embodiments, radio 114 may include one or more wireless receivers (Rx) including circuitry and/or logic to receive wireless communication signals, RF signals, frames, blocks, transmission streams, packets, messages, data items, and/or data. For example, radio 114 may include at least one receiver 116.

In some demonstrative embodiments, radio 114 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118.

In some demonstrative embodiments, radio 114, transmitter 118, and/or receiver 116 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 may include or may be implemented as part of a wireless Network Interface Card (NIC), and the like.

In some demonstrative embodiments, radio 114 may be configured to communicate over a 2.4 GHz band, a 5 GHz band, an mmWave band, a S1G band, and/or any other band.

In some demonstrative embodiments, radio 114 may include, or may be associated with, one or more antennas 107.

In one example, device 102 may include a single antenna 107. In another example, device may include two or more antennas 107.

Antennas 107 may include any type of antennas suitable for transmitting and/or receiving wireless communication signals, blocks, frames, transmission streams, packets, messages and/or data. For example, antennas 107 may include any suitable configuration, structure and/or arrangement of one or more antenna elements, components, units, assemblies and/or arrays. Antennas 107 may include, for example, antennas suitable for directional communication, e.g., using beamforming techniques. For example, antennas 107 may include a phased array antenna, a multiple element antenna, a set of switched beam antennas, and/or the like. In some embodiments, antennas 107 may implement transmit and receive functionalities using separate transmit and receive antenna elements. In some embodiments, antennas 107 may implement transmit and receive functionalities using common and/or integrated transmit/receive elements.

In some demonstrative embodiments, device 102 may include a controller 124 configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, 160, 180, and/or one or more other devices, e.g., as described below.

In some demonstrative embodiments, controller 124 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controller 124, respectively. Additionally or alternatively, one or more functionalities of controller 124 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative embodiments, at least part of the functionality of controller 124 may be implemented as part of one or more elements of radio 114.

In other embodiments, the functionality of controller 124 may be implemented as part of any other element of device 102.

In some demonstrative embodiments, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative embodiments, message processor 128 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processor 128. Additionally or alternatively, one or more functionalities of message processor 128 may be implemented by logic, which may be executed by a machine and/or one or more processors, e.g., as described below.

In some demonstrative embodiments, at least part of the functionality of message processor 128 may be implemented as part of radio 114.

In some demonstrative embodiments, at least part of the functionality of message processor 128 may be implemented as part of controller 124.

In other embodiments, the functionality of message processor 128 may be implemented as part of any other element of device 102.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, wireless communication devices 102, 140, 160 and/or 180 may form, or may communicate as part of, a wireless local area network (WLAN).

In some demonstrative embodiments, wireless communication devices 102, 140, 160 and/or 180 may form, or may communicate as part of, a Wi-Fi network.

In other embodiments, wireless communication devices 102, 140, 160 and/or 180 may form, and/or communicate as part of, any other additional or alternative network.

In some demonstrative embodiments, device 102 may include, operate as, perform the role of, and/or perform one or more functionalities of an AP STA.

In some demonstrative embodiments, devices 102, 160, 180 and/or device 140 may include, operate as, perform the role of, and/or perform one or more functionalities of, one or more STAs. For example, devices 140, 160 and/or 180 may include at least one STA.

In some demonstrative embodiments, there may be a need to address one or more technical inefficiencies, disadvantages and/or problems in one or more use cases and/or scenarios, for example, with usage of one or more IEEE802.11 standards, standard enhancements, or any other Standards, for example, for simultaneous UL transmissions from multiple STAs, e.g., as described below.

In some demonstrative embodiments, devices 102, 140, 160 and/or 180 may be configured to implement a Trigger-Based (TB) Multi-User (MU) Uplink (UL) physical layer convergence protocol (PLCP) Protocol Data Unit PPDU transmission, in which an AP and a plurality of STA communicate simultaneous UL transmissions from the plurality of STA to the AP, for example, in accordance with an IEEE802.11ax Standard, e.g., as described below.

In some demonstrative embodiments, an AP, e.g., device 102, may be configured, for example, in accordance with the IEEE802.11ax Standard, to solicit the simultaneous UL transmissions from a plurality of STAs, e.g., devices 140, 160 and/or 180, for example, by sending a trigger frame, e.g., as described below.

Figure 2B:
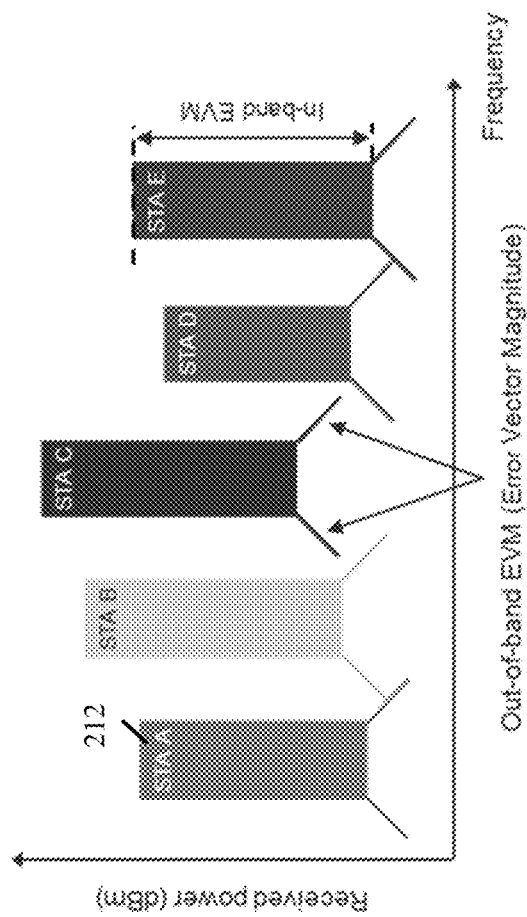
FIG. 2B is a schematic illustration of a graph depicting received power of uplink transmissions of a trigger-based multi-user uplink transmission according to the scheme of FIG. 2A.
Figure 2A:
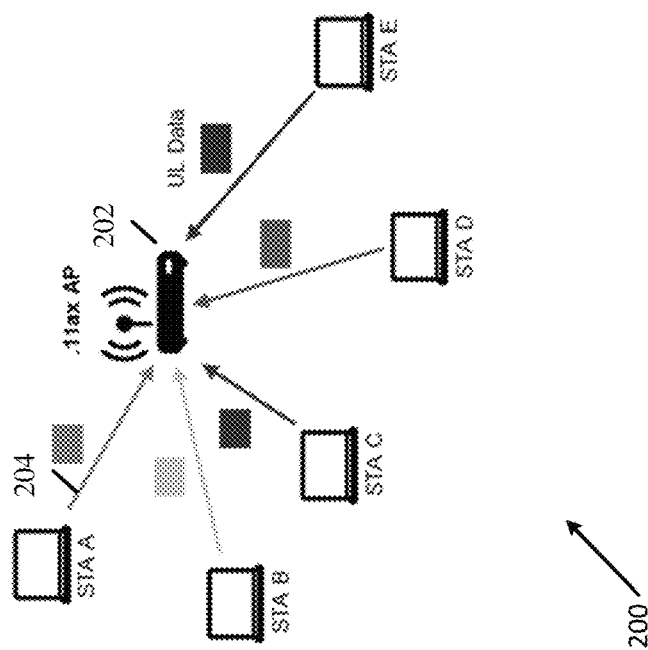
FIG. 2A is a schematic illustration of a trigger-based multi-user uplink transmission scheme, which may be implemented in accordance with some demonstrative embodiments.

Reference is made to FIG. 2A, which schematically illustrates a Trigger-Based MU UL transmission scheme 200, which may be implemented in accordance with some demonstrative embodiments.

In one example, Trigger-Based MU UL transmission scheme 200 may be configured to support an OFDMA TB MU UL transmission, e.g., in accordance with the IEEE802.11ax Standard, and/or any other standard.

In some demonstrative embodiments, TB MU UL transmission scheme 200 may be configured to support communication of a plurality of UL transmissions from a plurality of STA to an AP 202.

In some demonstrative embodiments, the AP 202 may transmit a trigger frame, for example, to solicit the UL transmissions of the TB MU UL transmission from the plurality of STAs to the AP 202.

Reference is made to FIG. 2B, which schematically illustrates a graph 210 depicting received power of UL transmissions of a TB MU UL transmission according to the scheme of FIG. 2A.

In one example, a received power 212 may correspond to a received power of an uplink transmission 204 in the TB MU UL transmission from a STA A to AP 202.

Referring back to FIG. 1, in some demonstrative embodiments, device 102 may configure a trigger frame to solicit a TB MU UL transmission from a plurality of STAs e.g., including devices 140, 160 and/or 180, e.g., as described below.

In some demonstrative embodiments, the trigger frame may include transmit (Tx) configurations for the plurality of solicited UL STAs, e.g., as described below.

In some demonstrative embodiments, a Tx configuration for a solicited STA may include, for example, a target Received Signal Strength Indicator (RSSI), a Modulation and Coding Scheme (MCS), a Number of Spatial Streams (Nss), a Resource Unit (RU) allocation, and/or any other additional or alternative Tx configuration for the STA.

In some demonstrative embodiments, it may be advantageous to implement an AP, e.g., device 102, which may configure one or more Tx parameters, e.g., the target RSSI, the MCS, the Nss, the RU allocation and/or the like, for example, in such a way that an amount of potential Multi-User Interference (MUI), e.g., between UL transmissions from the plurality of STAs, may be minimized.

In one example, in one or more use cases, implementations, and/or scenarios, an AP may schedule, e.g., via a trigger frame, a TB MU UL transmission for a plurality of STAs, for example, for UL transmissions of UL frames, e.g., of UL control frames, which may require a high-level of robustness. For example, the UL control frames may include a Block Acknowledgement (Ack) (BA), a Beamforming Report (BFR), a Buffer Status Report (BSR), and/or any other additional or alternative UL control frame. According to this example, it may be advantageous to optimize Tx parameters for those UL control frames, for example, to achieve a reduced Packet Error Rate (PER) and/or an increased "robustness", which may make a re-transmission unnecessary, for example, while optimizing a throughput performance, for example, by using an increased MCS, e.g., different from an MCS=0.

In some demonstrative embodiments, device 102 may be configured to dynamically adjust Tx parameters for TB MU UL transmissions for UL frames, e.g., UL control frames, for example, to allow the UL transmissions to meet a target PER performance, for example, while maximizing throughput performance, e.g., as described below.

In some demonstrative embodiments, adjusting the Tx parameters for the TB MU UL transmissions may allow to minimize a transmission time, for example, for long control frames, e.g., a BFR frame, having a long PPDU duration, for example, while achieving a high level of robustness, e.g., a reduced PER, for the TB MU UL transmissions, e.g., as described below.

In some demonstrative embodiments, in some cases it may not be advantageous to use a lowest MCS, e.g., MCS 0, for example, by default, for frames that require robustness, e.g., to avoid a risk of re-transmissions e.g., as described below.

In one example, an AP may achieve a high reliability, for example, if the AP uses the lowest MCS for TB MU UL control frame transmissions, e.g., be default. However, the AP may suffer from a lower throughput performance with a longer PPDU transmission time.

In some demonstrative embodiments, device 102 may be configured to dynamically adjust an aggressiveness or conservativeness in selection of one or more Tx parameters, e.g., MCS selection, for TB MU UL transmissions, for example, based on a selected, e.g., a target, PER performance. For example, if a selected PER performance for frames is lower, e.g., less than 5%, than a normal PER performance, e.g., about 10%, for a data PPDU transmission for the frames, then the AP may be more conservative in MCS selection, e.g., to meet the selected PER performance, and vice versa, e.g., as described below.

In some demonstrative embodiments, device 102 may be configured to implement the aggressiveness or the conservativeness in the MCS selection for TB MU UL transmissions, for example, based on a Signal to Noise Ratio (SNR) margin value, e.g., as described below. In other embodiments, any other additional or alternative margin, parameter and/or mechanism may be implemented.

In some demonstrative embodiments, device 102 may be configured to adjust and/or optimize the Tx configuration for the TB MU UL PPDU transmissions based on one or more criteria, for example, based on the frame type and/or target PER performance, which may allow to increase, e.g., maximize, an overall throughput performance for the TB MU UL PPDU transmissions, for example, while achieving robustness for one or more types of frames, for example, control frames, e.g., as described below.

In some demonstrative embodiments, devices 102, 140, 160 and/or 180 may be configured to communicate a Trigger-Based (TB) Multi-User (MU) Uplink (UL) transmission from a plurality of STAs, e.g., devices 140, 160, and 180, to a STA, e.g., an AP, e.g., device 102, e.g., as described below.

In some demonstrative embodiments, controller 124 may be configured to control, cause and/or trigger the STA implemented by device 102 to determine an expected interference-based value corresponding to an UL transmission from a STA, e.g., the STA implemented by device 140, in a TB MU UL transmission to be communicated from a plurality of STAs, e.g., devices 140, 160 and/or 180, to device 102, e.g., as described below.

In some demonstrative embodiments, the expected interference-based value may include an expected Signal to Noise Ratio (SNR) value, e.g., as described below.

In other embodiments, the expected interference-based value may include any other additional or alternative value.

In some demonstrative embodiments, controller 124 may be configured to control, cause and/or trigger the STA implemented by device 102 to determine one or more transmit (Tx) configuration parameters for the STA, e.g., the STA implemented by device 140, based on the expected interference-based value corresponding to the UL transmission from device 140, e.g., as described below.

In some demonstrative embodiments, controller 124 may be configured to control, cause and/or trigger the STA implemented by device 102 to transmit a trigger frame to trigger the TB MU UL transmission, e.g., as described below.

In some demonstrative embodiments, the trigger frame may include the one or more Tx configuration parameters to configure the UL transmission from device 140, e.g., as described below.

In some demonstrative embodiments, controller 124 may be configured to control, cause and/or trigger the STA implemented by device 102 to determine the one or more Tx configuration parameters according to a criterion, which is based on a target reliability performance for the TB MU UL transmission, and/or based on a target throughput performance for the TB MU UL transmission, e.g., as described below.

In some demonstrative embodiments, the one or more Tx configuration parameters may include a Modulation and Coding Scheme (MCS) for the UL transmission from device 140, e.g., as described below.

In some demonstrative embodiments, the one or more Tx configuration parameters may include a Number of Spatial Streams (Nss) for the UL transmission from the STA implemented by device 140, e.g., as described below.

In other embodiments, the one or more Tx configuration parameters may include any other Tx parameters for the UL transmission from the STA implemented by device 140.

In some demonstrative embodiments, controller 124 may be configured to control, cause and/or trigger the STA implemented by device 102 to determine one or more first Tx configuration parameters for a first STA of the plurality of STAs, e.g., device 140.

In some demonstrative embodiments, controller 124 may be configured to control, cause and/or trigger the STA implemented by device 102 to determine one or more second Tx configuration parameters for a second STA of the plurality of STAs, e.g., device 160.

In some demonstrative embodiments, the one or more second Tx configuration parameters may be different from the one or more first Tx configuration parameters.

In some demonstrative embodiments, controller 124 may be configured to control, cause and/or trigger the STA implemented by device 102 to transmit the trigger frame including the one or more first Tx configuration parameters to configure the UL transmission from device 140, and the one or more second Tx configuration parameters to configure the UL transmission from device 160, e.g., as described below.

In some demonstrative embodiments, controller 124 may be configured to control, cause and/or trigger the STA implemented by device 102 to determine the expected interference-based value, for example, based on an estimated interference for the STA implemented by device 140, and based on a margin value, e.g., as described below.

In some demonstrative embodiments, controller 124 may be configured to control, cause and/or trigger the STA implemented by device 102 to determine the expected interference-based value, for example, based on a subtraction of the margin value from the estimated interference for device 140, e.g., as described below.

In some demonstrative embodiments, controller 124 may be configured to control, cause and/or trigger the STA implemented by device 102 to retrieve the margin value from a Lookup Table (LUT), for example, based on the target PER for the UL transmission from the STA implemented by device 140, e.g., as described below.

In one example, the LUT may be predefined and/or predetermined, for example, based on one or more simulations and/or statistics.

In another example, the LUT may be configured based on any other method, calculation, algorithm, and/or the like.

In some demonstrative embodiments, controller 124 may be configured to control, cause and/or trigger the STA implemented by device 102 to determine the margin value, for example, based on a reliability-based requirement for the UL transmission from device 140, e.g., as described below.

In some demonstrative embodiments, controller 124 may be configured to control, cause and/or trigger the STA implemented by device 102 to determine the margin value, for example, based on a target Packet Error Rate (PER) for the UL transmission from device 140, e.g., as described below.

In some demonstrative embodiments, controller 124 may be configured to control, cause and/or trigger the STA implemented by device 102 to determine the margin value, for example, based on a frame size of a frame to be communicated in the UL transmission from device 140, e.g., as described below.

In some demonstrative embodiments, controller 124 may be configured to control, cause and/or trigger the STA implemented by device 102 to use a first margin value, for example, when a frame of a first length is to be included in the UL transmission from device 140; and/or to use a second margin value, for example, when a frame of a second length is to be included in the UL transmission from device 140, e.g., as described below.

In some demonstrative embodiments, the first length may be longer than the second length, and the first margin value may be lower than the second margin value, e.g., as described below.

Figure 3:
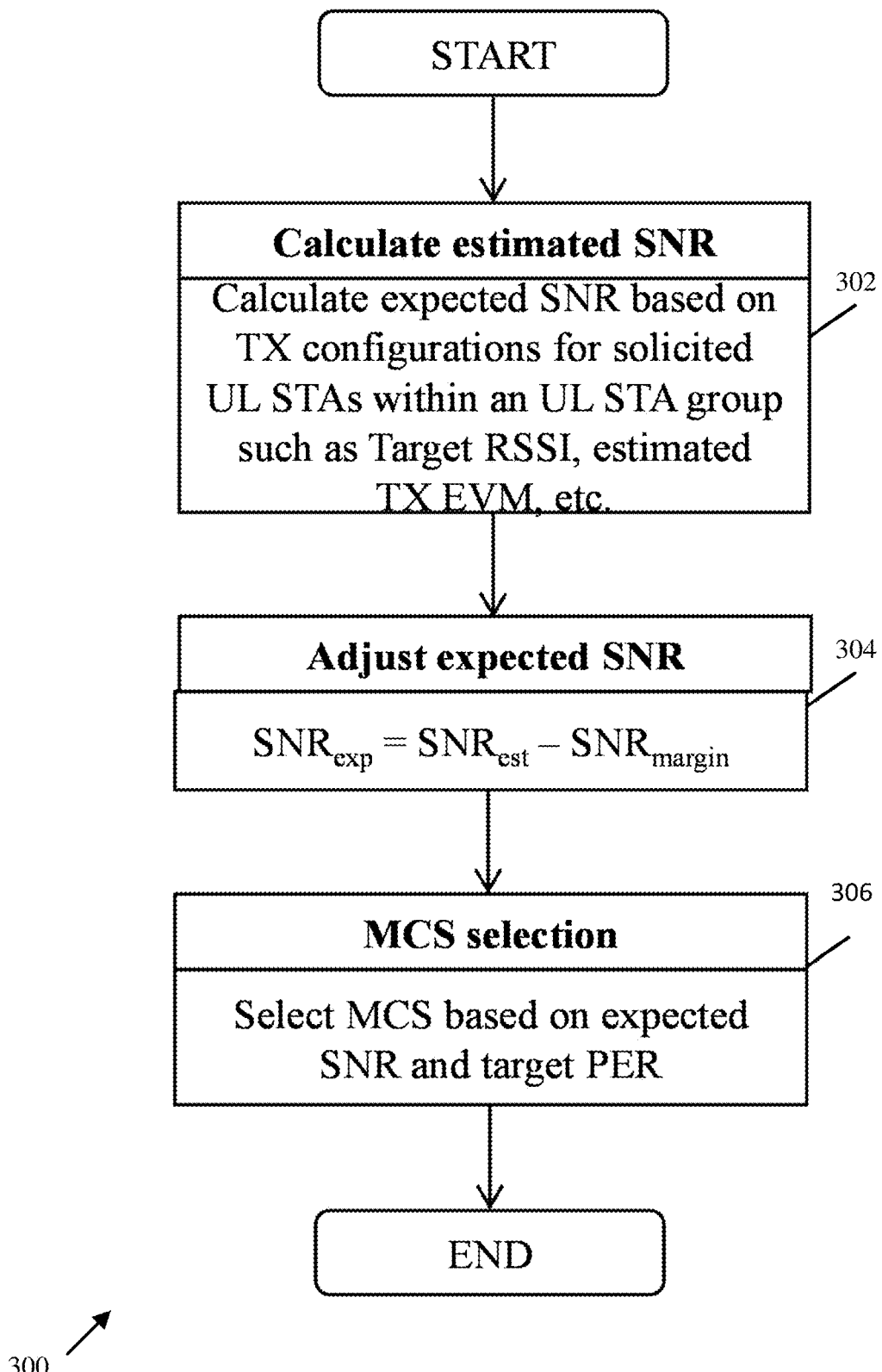
FIG. 3 is a schematic flow-chart illustration of a method of determining a Modulation and Coding Scheme (MCS), in accordance with some demonstrative embodiments.

Reference is made to FIG. 3, which schematically illustrates a method 300 of determining an MCS, in accordance with some demonstrative embodiments. For example, one or more of the operations of the method of FIG. 3 may be performed by a wireless communication system, e.g., system 100 (FIG. 1); a wireless communication device, e.g., device 102 (FIG. 1); a controller, e.g., controller 124 (FIG. 1); a radio, e.g., radio 114 (FIG. 1); a message processor, e.g., message processor 128 (FIG. 1); a transmitter, e.g., transmitter 118; and/or a receiver, e.g., receiver 116 (FIG. 1).

In some demonstrative embodiments, as indicated at block 302, the method may include determining at a wireless communication device an estimated interference, e.g., an estimated SNR, denoted $SNR_{est}$, for an UL transmission in a TB MU UL transmission from a STA to the wireless communication device. For example, device 102 (FIG. 1) may determine the estimated interference based on a Tx configuration for the STA, for example, a target RSSI, an estimated Tx Error Vector Magnitude (EVM), and/or the like.

In some demonstrative embodiments, as indicated at block 304, the method may include determining an expected interference based value, e.g., an expected SNR value, denoted $SNR_{exp}$, for example, by subtracting a margin value, e.g., an SNR margin value, denoted $SNR_{margin}$, from the estimated interference $SNR_{est}$.

In one example, an AP, e.g., device 102 (FIG. 1), may be configured to determine the MCS, for example, based on the SNR margin value $SNR_{margin}$, for example, as part of MU UL power control and/or link adaptation algorithms. For example, the AP may estimate the expected SNR performance, e.g., the expected SNR value $SNR_{exp}$, of each UL STA for a solicited MU UL PPDU transmission, for example, based on the target RSSI, estimated Error Vector Magnitude (EVM), and/or the like.

In one example, the AP, e.g., device 102 (FIG. 1), may be configured to subtract the SNR margin value $SNR_{margin}$ from the expected SNR value $SNR_{exp}$, for example, to introduce an additional margin or buffer, e.g., before mapping the expected SNR value $SNR_{exp}$ to an MCS. For example, an additional SNR adjustment may be utilized, for example, at a beginning of TB MU UL transmissions, for example, due to an increased number of unknowns in RF environments, e.g., frequency selective fading, RSSI and/or Tx power measurement errors at the AP and/or solicited STAs, an inaccuracy in power pre-correction procedure, and/or the like, which may result with a reduced accuracy of an initial SNR estimation.

In some demonstrative embodiments, as indicated at block 306, the method may include selecting a Tx configuration parameter, e.g., an MCS, a number of spatial streams and/or any other Tx configuration parameter, for example, based on the expected interference value $SNR_{exp}$ and, optionally, a target PER.

In one example, an AP, e.g., device 102 (FIG. 1), may be configured to map the expected interference value $SNR_{exp}$, for example, to at least one Tx configuration parameter, e.g., an MCS, for example, based on a LUT, which may be predefined and/or preconfigured, for example, based on one or more simulations and/or statistics.

In another example, an AP, e.g., device 102 (FIG. 1), may be configured to determine the MCS value based on the expected interference value $SNR_{exp}$, for example, according to any other method, calculation, algorithm and/or the like.

In one example, using the SNR margin value $SNR_{margin}$ may achieve a suitable balance between throughput and PER performance. For example, if the SNR margin value $SNR_{margin}$ is set too high, for example, when underestimating the SNR performance and being more conservative in MCS selection, the AP may achieve a lower PER, for example, at a cost of degraded throughput, e.g., due to a low PHY rate, and vice versa.

Referring back to FIG. 1, in some demonstrative embodiments, controller 124 may be configured to control, cause and/or trigger the STA implemented by device 102 to determine the margin value based on a frame type of a frame to be communicated in the UL transmission from device 140, e.g., as described below.

In some demonstrative embodiments, controller 124 may be configured to control, cause and/or trigger the STA implemented by device 102 to use a first margin value when a frame of a first type, e.g., a control frame, is to be included in the UL transmission from device 140, and to use a second margin value when a frame of a second type, e.g., a data frame, is to be included in the UL transmission from device 140, e.g., as described below.

In some demonstrative embodiments, the first margin value may be higher than the second margin value, e.g., as described below.

In some demonstrative embodiments, controller 124 may be configured to determine an SNR margin value, for example, based on a frame type of a control frame, for example, a robust frame, e.g., a BA frame, a BFR frame, a BSR frame and/or any other additional or alternative control frame type, e.g., as described below.

In some demonstrative embodiments, controller 124 may be configured to control, cause and/or trigger the STA implemented by device 102 to use a first margin value when a first control frame of a first type, e.g., a BA frame, is to be included in the UL transmission from device 140, and to use a second margin value when a second control frame of a second type, e.g., a BFR frame, is to be included in the UL transmission from device 140, e.g., as described below.

In some demonstrative embodiments, the first margin value may be different from the second margin value, e.g., as described below.

Figure 4:
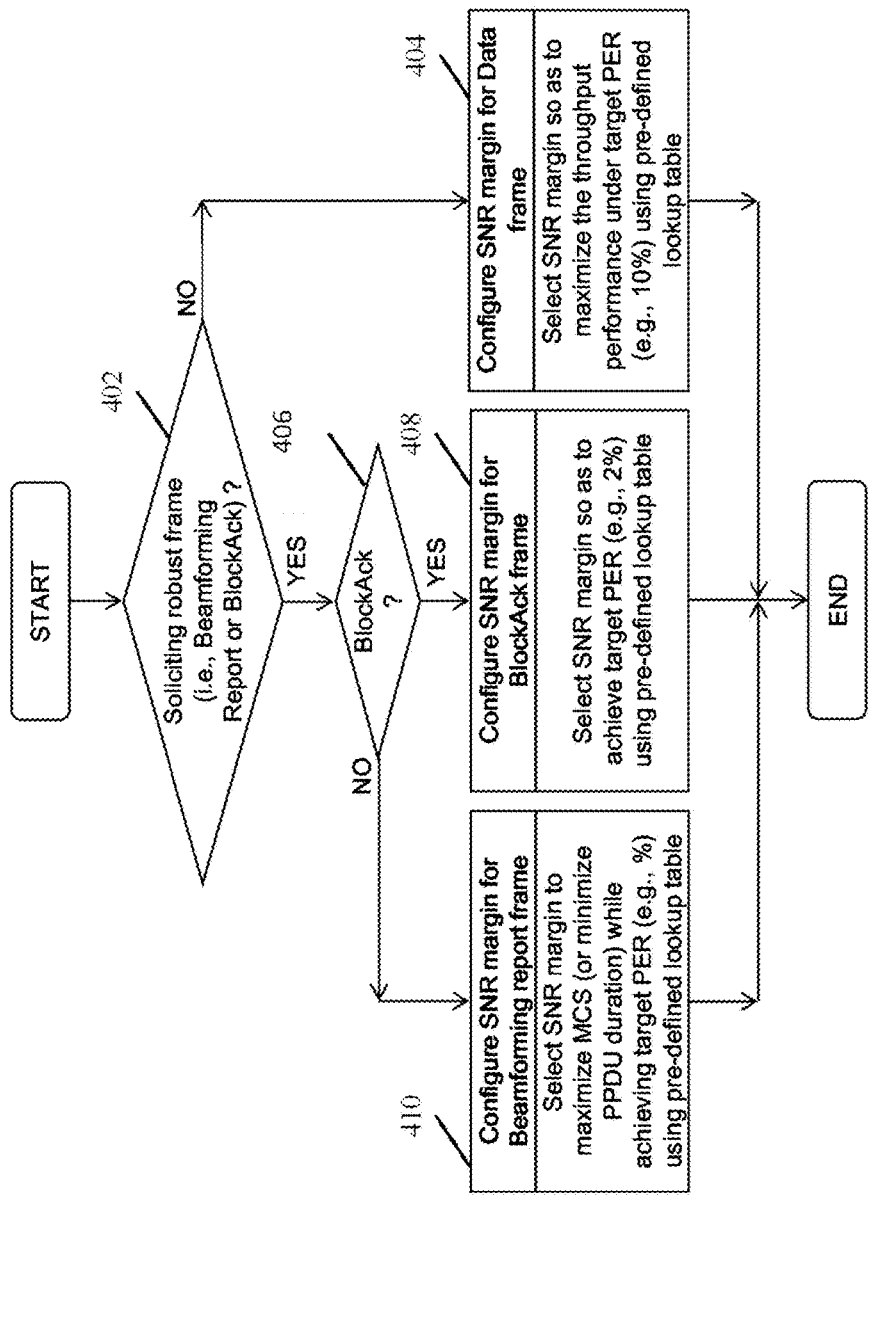
FIG. 4 is a schematic flow-chart illustration of a method of determining a Signal to Noise Ratio (SNR) margin value, in accordance with some demonstrative embodiments.

Reference is made to FIG. 4, which schematically illustrates a method 400 of determining an SNR margin value, in accordance with some demonstrative embodiments. For example, one or more of the operations of the method of FIG. 4 may be performed by a wireless communication system, e.g., system 100 (FIG. 1); a wireless communication device, e.g., device 102 (FIG. 1); a controller, e.g., controller 124 (FIG. 1); a radio, e.g., radio 114 (FIG. 1); a message processor, e.g., message processor 128 (FIG. 1); a transmitter, e.g., transmitter 118 (FIG. 1); and/or a receiver, e.g., receiver 116 (FIG. 1).

In some demonstrative embodiments, as indicated at block 402, the method may include determining whether a TB MU UL transmission is to include an UL transmission of a control frame or a data frame.

In some demonstrative embodiments, as indicated at block 404, the method may include determining an SNR margin value for a data frame, for example, when the TB MU UL transmission is to include the UL transmission of a data frame.

In one example, when the TB MU UL transmission is to include a data frame, the SNR margin value may be configured to increase, e.g., maximize, throughput, for example, based on a target PER.

In some demonstrative embodiments, as indicated at block 406, the method may include determining whether the TB MU UL transmission is to include an UL transmission of a BA frame, for example, when the TB MU UL transmission is to include an UL transmission of a control frame.

In some demonstrative embodiments, as indicated at block 408, the method may include determining an SNR margin value for the BA frame, for example, when the TB MU UL transmission is to include the UL transmission of the BA frame.

In one example, when the TB MU UL transmission is to include the UL transmission of the BA frame, the SNR margin value may be configured to achieve a target PER, e.g., 2% PER.

In some demonstrative embodiments, as indicated at block 410, the method may include determining an SNR margin value for a BFR frame, for example, when the TB MU UL transmission is to include the UL transmission of the BFR frame, e.g., as described above.

In one example, when the TB MU UL transmission is to include the UL transmission of the BA frame, the SNR margin value may be configured to maximize an MCS while achieving a particular, e.g., predefined or calculated, target PER.

In some demonstrative embodiments, an AP, e.g., device 102 (FIG. 1), may suffer from a low throughput with an increased airtime, e.g., PPDU duration, for example, if the AP always uses the lowest MCS, e.g., MCS0, for robust frames, e.g., control frames. In order to avoid such a situation, the AP may configure the SNR margin parameter to meet a certain target PER performance, for example, when triggering robust frames, e.g., control frames, from UL STAs.

In some demonstrative embodiments, the AP, e.g., device 102 (FIG. 1), may be configured to balance between reliable performance for robust frames, throughput performance, and/or minimizing airtime.

In one example, the AP may be configured to achieve a lowest PER performance for some frames, e.g., BlockAck frames, for example, without worrying about the PPDU duration.

In another example, the AP may be configured to increase an MCS, e.g., in order to reduce PPDU duration for some frames, e.g., BFR and/or BSR frames.

In some demonstrative embodiments, controller 124 (FIG. 1) may be configured to retrieve the SNR margin value from a LUT, for example, based on a target PER, e.g., according to the following Table 1, which includes SNR margin parameter values for different target PER values:

TABLE 1

| Target PER (%) | 10% | 8% | 4% | 3% | 2% |
|---|---|---|---|---|---|
| SNR margin (dB) | 5 | 6 | 7 | 8 | 10 |

In one example, one or more SNR margin values of Table 1 may be based on target PER values, e.g., in percentages, for example, with RU-level frequency selective fading.

In some demonstrative embodiments, an AP, e.g., device 102 (FIG. 1), may be configured to store Table 1, for example, in memory 194 and/or storage 195, and to retrieve a suitable SNR margin value, for example, based on the target PER performance of a solicited frame type.

In one example, device 102 and/or controller 124 (FIG. 1) may access Table 1, for example, to retrieve an SNR margin value of 10 dB, e.g., for a BA frame having a target PER of 2%.

In some demonstrative embodiments, one or more simulations may be performed, for example, to demonstrate an impact of the SNR margin value on performance, e.g., as described below.

The following Table 2 includes simulation parameters, which may be implemented for one or more simulations:

TABLE 2

| Parameter | Description |
| --- | --- |
| # of STAs in UL Group | 4 |
| RU size | 20 MHz per STA |
| WLAN Topology | STAs are randomly distributed 30-80m from the AP |
| SU UL channel BW | 20 MHz |
| Channel Model | IEEE Channel D |
| Measurement Errors | Class A devices (i.e., ±3 dB); Pseudo-static for AP side errors |
| # of TXOP | 1 |
| # of PPDUs within TXOP | 1 |
| Average RSSI variation per RU | ±6 dB due to freq. selective fading |
| RSSI variation within an RU | 0-6 dB due to per-tone SNR variations |
| Dynamic channel condition | ±0-5 dB variations once every 20 ms |
| PER lower threshold | 5% |

In some demonstrative embodiments, a first simulation scenario, e.g., RU-level frequency selective fading, may be defined to have each RU experience up to ±6 dB variations, e.g., in effective SNR, for example, due to frequency selective fading within a channel bandwidth.

In some demonstrative embodiments, a second simulation scenario, e.g., Per-tone SNR variation, may be defined such that there may be an additional degradation, e.g., in addition to the RU-level frequency selective fading, of about 0-6 dB, e.g., in effective SNR, for example, due to per-tone SNR variations within an RU.

Figure 5:
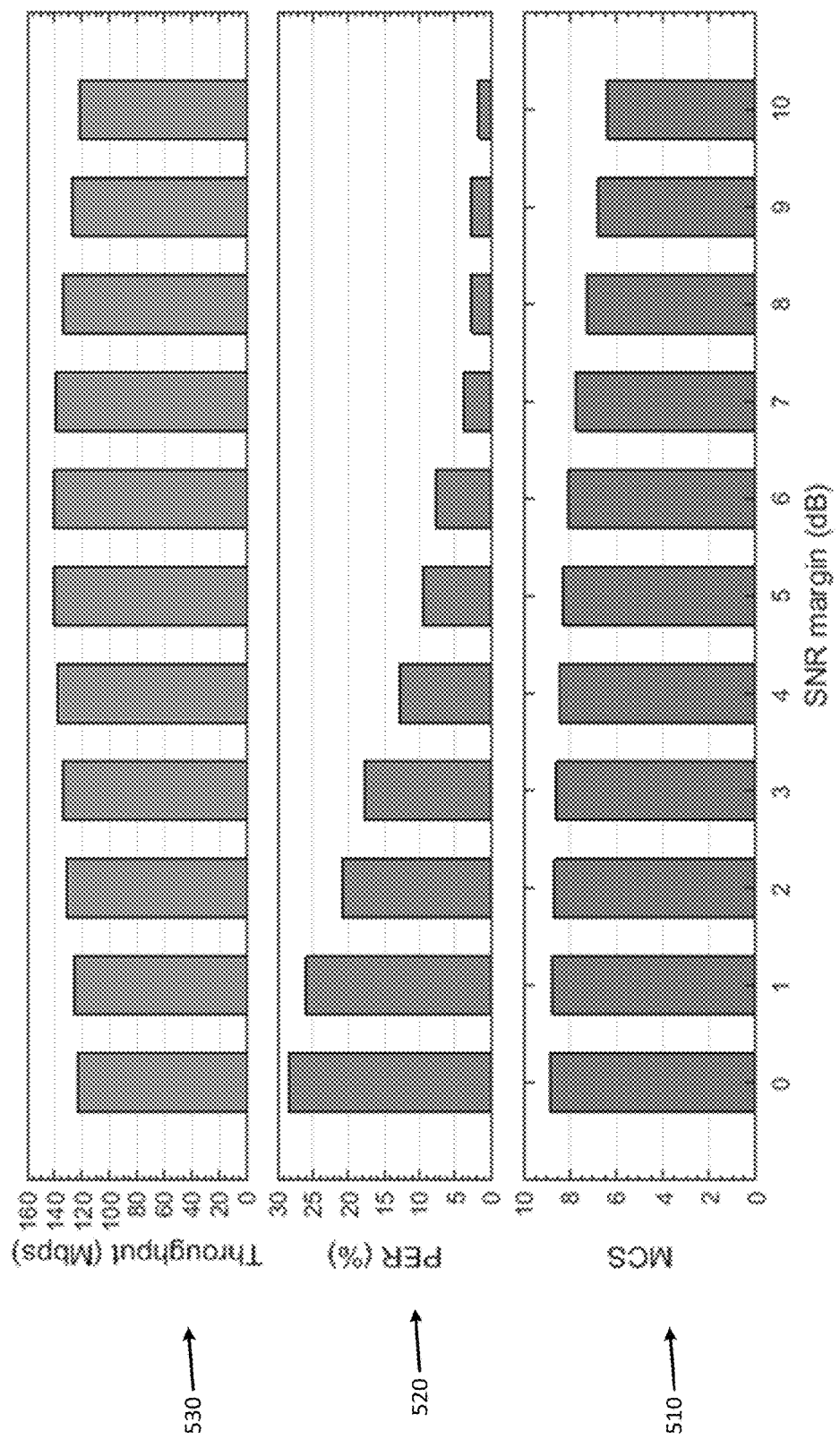
FIG. 5 is a schematic illustration of graphs depicting an MCS, a Packet Error Rate (PER), and a throughput as a function of SNR margin values, in accordance with some demonstrative embodiments.

Reference is made to FIG. 5, which schematically illustrates graphs depicting an MCS 510, a PER 520, and a throughput 530 as a function of SNR margin values, in accordance with some demonstrative embodiments.

In one example, the measurements of FIG. 5, may be obtained according to the first simulation scenario, e.g., the RU-level frequency selective fading.

As shown in FIG. 5, when an SNR margin value is small, e.g., 0 dB, PER measurements 520 may be high, and the throughput 530 may not be optimal, for example, due to the high PER.

As shown in FIG. 5, when the SNR margin value increases, PER performance 510 quickly decreases, and, as a result, throughput performance 530 improves. However, when the SNR margin value is too large, the throughput 530 decreases again, for example, due to a low MCS.

As shown in FIG. 5, if an AP, e.g., device 102 (FIG. 1) targets a certain PER performance for a certain type of UL frames, then it can adjust the SNR margin value accordingly, e.g., according to Table 1.

Figure 6:
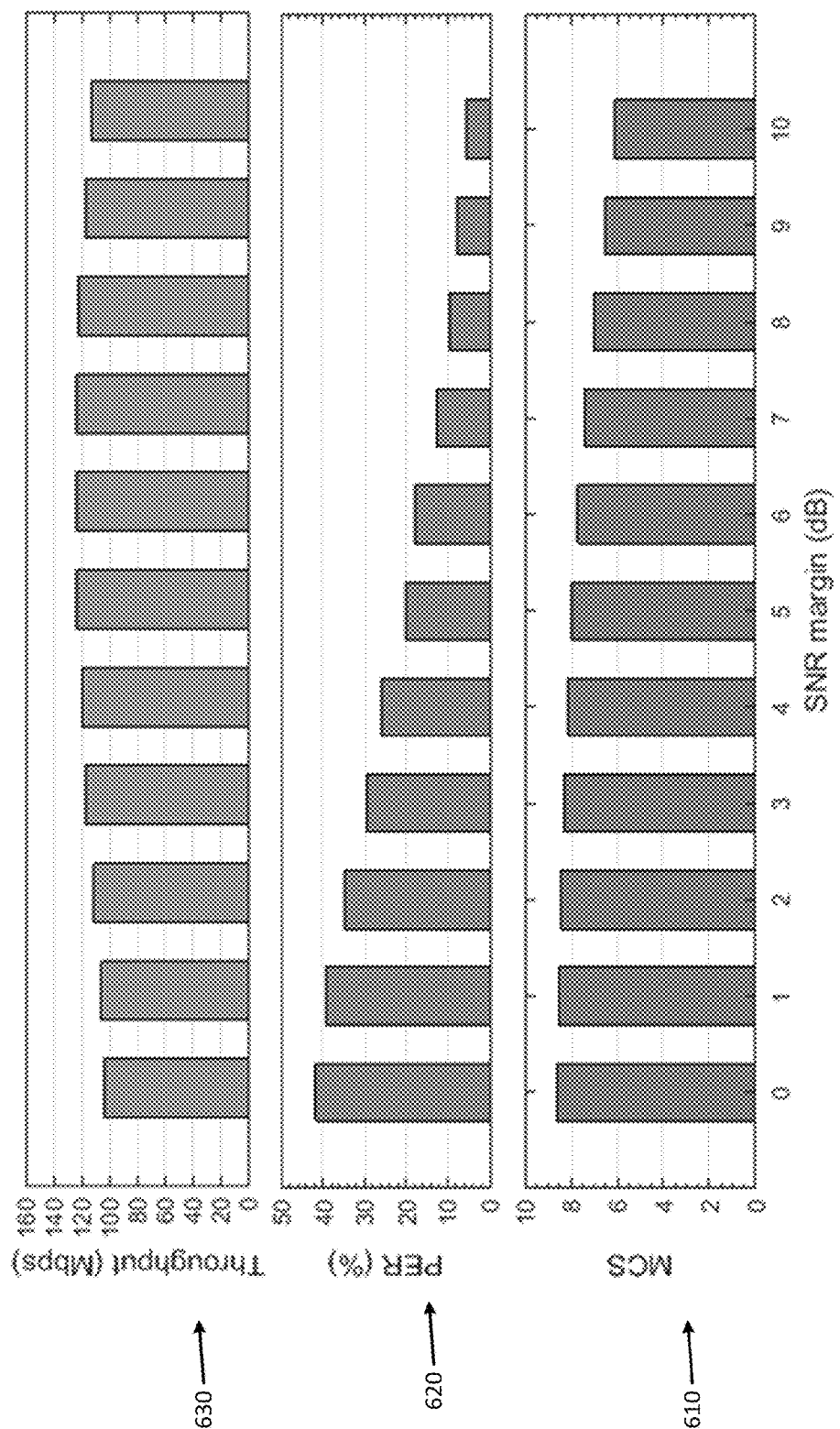
FIG. 6 is a schematic illustration of graphs depicting an MCS, a PER, and a throughput as a function of SNR margin values, in accordance with some demonstrative embodiments.

Reference is made to FIG. 6, which schematically illustrates graphs depicting an MCS 610, a PER 620, and a throughput 630 as a function of SNR margin values, in accordance with some demonstrative embodiments.

In one example, the measurements of FIG. 6, may be obtained according to the second simulation scenario, e.g., the Per-tone SNR variation.

In some demonstrative embodiments, FIG. 6 shows similar behavior to the measurements in FIG. 5. However, throughput 630 and PER performance 620 may degrade, for example, due to additional degradation in channel gain or effective SNR, e.g., due to the per-tone SNR variations within an RU.

According to the measurements of FIG. 5 and FIG. 6, an AP, e.g., device 102 (FIG. 1), may be configured to dynamically optimize an SNR margin parameter, for example, to achieve a certain target PER performance for a robust frame type, e.g., control frames. For example, an increased SNR margin value of −10 dB may achieve a lower PER performance of −2%, e.g., as shown by PER performance 520 and 620.

Figure 7:
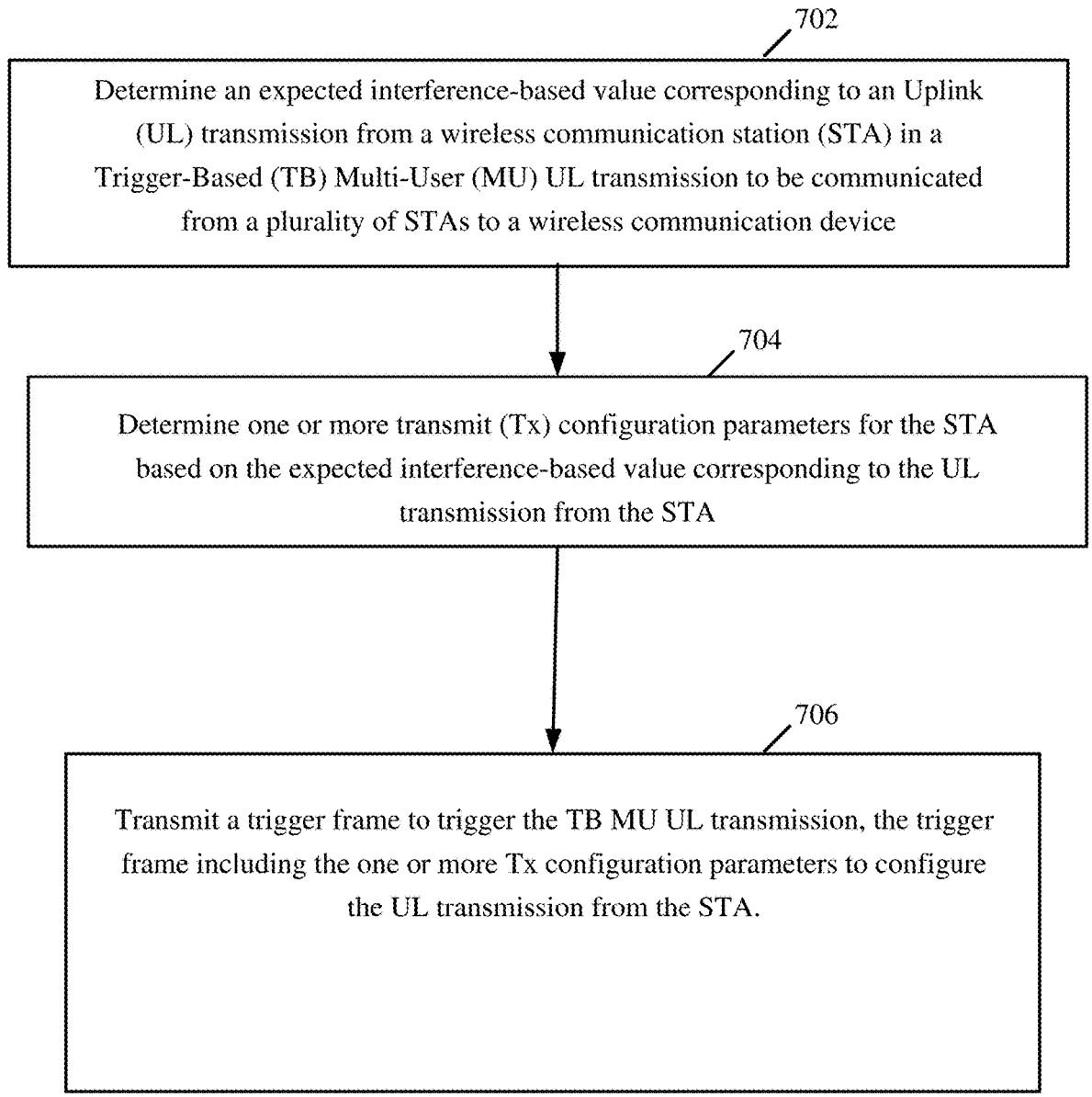
FIG. 7 is a schematic flow-chart illustration of a method of configuring an uplink transmission in a trigger-based multi-user uplink transmission, in accordance with some demonstrative embodiments.

Reference is made to FIG. 7, which schematically illustrates a method of configuring an uplink transmission in a trigger-based multi-user uplink transmission, in accordance with some demonstrative embodiments. For example, one or more of the operations of the method of FIG. 7 may be performed by a wireless communication system, e.g., system 100 (FIG. 1); a wireless communication device, e.g., device 102 (FIG. 1); a controller, e.g., controller 124 (FIG. 1); a radio, e.g., radio 114 (FIG. 1); a message processor, e.g., message processor 128 (FIG. 1); a transmitter, e.g., transmitter 118; and/or a receiver, e.g., receiver 116 (FIG. 1).

As indicated at block 702, the method may include determining at a wireless communication device an expected interference-based value corresponding to an UL transmission from a STA in a TB MU UL transmission to be communicated from a plurality of STAs to the wireless communication device. For example, controller 124 (FIG. 1) may control, cause and/or trigger the STA implemented by device 102 (FIG. 1) to determine the expected interference-based value corresponding to the UL transmission from device 140 (FIG. 1) in the TB MU UL transmission to be communicated from the plurality of STAs 140, 160 and/or 180 (FIG. 1) to device 102 (FIG. 1), e.g., as described above.

As indicated at block 704, the method may include determining one or more Tx configuration parameters for the STA based on the expected interference-based value corresponding to the UL transmission from the STA. For example, controller 124 (FIG. 1) may control, cause and/or trigger the STA implemented by device 102 (FIG. 1) to determine the one or more transmit (Tx) configuration parameters for device 140 (FIG. 1), based on the expected interference-based value corresponding to the UL transmission from device 140 (FIG. 1), e.g., as described above.

As indicated at block 706, the method may include transmitting a trigger frame to trigger the TB MU UL transmission, the trigger frame may include the one or more Tx configuration parameters to configure the UL transmission from the STA. For example, controller 124 (FIG. 1) may control, cause and/or trigger the STA implemented by device 102 (FIG. 1) to transmit the trigger frame to trigger the TB MU UL transmission, the trigger frame may include the one or more Tx configuration parameters to configure the UL transmission from device 140 (FIG. 1), e.g., as described above.

Figure 8:
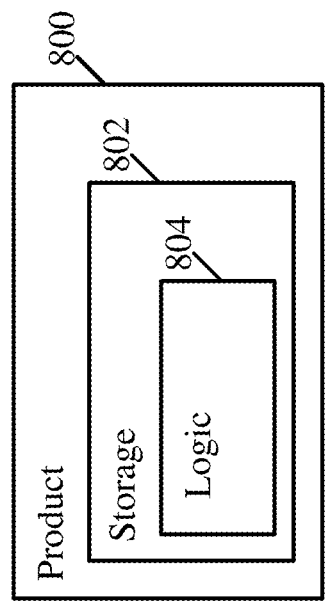
FIG. 8 is a schematic illustration of a product of manufacture, in accordance with some demonstrative embodiments.

Reference is made to FIG. 8, which schematically illustrates a product of manufacture 800, in accordance with some demonstrative embodiments. Product 800 may include one or more tangible computer-readable ("machine readable") non-transitory storage media 802, which may include computer-executable instructions, e.g., implemented by logic 804, operable to, when executed by at least one processor, e.g., computer processor, enable the at least one processor to implement one or more operations at devices 102, 140, 160 and/or 180 (FIG. 1), radio 114 (FIG. 1), transmitter 118 (FIG. 1), receiver 116 (FIG. 1), controller 124 (FIG. 1), and/or message processor 128 (FIG. 1), to cause devices 102, 140, 160 and/or 180 (FIG. 1), radio 114 (FIG. 1), transmitter 118 (FIG. 1), receiver 116 (FIG. 1), controller 124 (FIG. 1), and/or message processor 128 (FIG. 1) to perform one or more operations, and/or to perform, trigger and/or implement one or more operations, communications and/or functionalities described above with reference to FIGS. 1, 2, 3, 4, 5, 6, and/or 7, and/or one or more operations described herein. The phrases "non-transitory machine-readable media (medium)" and "computer-readable non-transitory storage media (medium)" are directed to include all computer-readable media, with the sole exception being a transitory propagating signal.

In some demonstrative embodiments, product 800 and/or storage media 802 may include one or more types of computer-readable storage media capable of storing data, including volatile memory, non-volatile memory, removable or non-removable memory, erasable or non-erasable memory, writeable or re-writeable memory, and the like. For example, storage media 802 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 804 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 804 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a wireless communication device to determine an expected interference-based value corresponding to an Uplink (UL) transmission from a wireless communication station (STA) in a Trigger-Based (TB) Multi-User (MU) UL transmission to be communicated from a plurality of STAs to the wireless communication device; determine one or more transmit (Tx) configuration parameters for the STA based on the expected interference-based value corresponding to the UL transmission from the STA; and transmit a trigger frame to trigger the TB MU UL transmission, the trigger frame comprising the one or more Tx configuration parameters to configure the UL transmission from the STA.

Example 2 includes the subject matter of Example 1, and optionally, wherein the apparatus is configured to cause the wireless communication device to determine the expected interference-based value based on an estimated interference for the STA and based on a margin value.

Example 3 includes the subject matter of Example 2, and optionally, wherein the apparatus is configured to cause the wireless communication device to determine the expected interference-based value based on a subtraction of the margin value from the estimated interference for the STA.

Example 4 includes the subject matter of Example 2 or 3, and optionally, wherein the apparatus is configured to cause the wireless communication device to determine the margin value based on a reliability-based requirement for the UL transmission from the STA.

Example 5 includes the subject matter of any one of Examples 2-4, and optionally, wherein the apparatus is configured to cause the wireless communication device to determine the margin value based on a target Packet Error Rate (PER) for the UL transmission from the STA.

Example 6 includes the subject matter of any one of Examples 2-5, and optionally, wherein the apparatus is configured to cause the wireless communication device to determine the margin value based on a frame type of a frame to be communicated in the UL transmission from the STA.

Example 7 includes the subject matter of Example 6, and optionally, wherein the apparatus is configured to cause the wireless communication device to use a first margin value when a control frame is to be included in the UL transmission from the STA, and to use a second margin value when a data frame is to be included in the UL transmission from the STA, the first margin value higher than the second margin value.

Example 8 includes the subject matter of any one of Examples 2-7, and optionally, wherein the apparatus is configured to cause the wireless communication device to determine the margin value based on a frame size of a frame to be communicated in the UL transmission from the STA.

Example 9 includes the subject matter of Example 8, and optionally, wherein the apparatus is configured to cause the wireless communication device to use a first margin value when a frame of a first length is to be included in the UL transmission from the STA, and to use a second margin value when a frame of a second length is to be included in the UL transmission from the STA, the first length longer than the second length, the first margin value lower than the second margin value.

Example 10 includes the subject matter of any one of Examples 2-9, and optionally, wherein the apparatus is configured to cause the wireless communication device to retrieve the margin value from a Lookup Table (LUT) based on a target Packet Error Rate (PER) for the UL transmission from the STA.

Example 11 includes the subject matter of any one of Examples 1-10, and optionally, wherein the one or more Tx configuration parameters comprise a Modulation and Coding Scheme (MCS) for the UL transmission from the STA.

Example 12 includes the subject matter of any one of Examples 1-11, and optionally, wherein the one or more Tx configuration parameters comprise a Number of Spatial Streams (Nss) for the UL transmission from the STA.

Example 13 includes the subject matter of any one of Examples 1-12, and optionally, wherein the apparatus is configured to cause the wireless communication device to determine one or more first Tx configuration parameters for a first STA of the plurality of STAs, to determine one or more second Tx configuration parameters for a second STA of the plurality of STAs, and to transmit the trigger frame comprising the one or more first Tx configuration parameters to configure the UL transmission from the first STA and the one or more second Tx configuration parameters to configure the UL transmission from the second STA, the one or more second Tx configuration parameters different from the one or more first Tx configuration parameters.

Example 14 includes the subject matter of any one of Examples 1-13, and optionally, wherein the apparatus is configured to cause the wireless communication device to determine the one or more Tx configuration parameters according to a criterion, which is based on a target reliability performance for the TB MU UL transmission and based on a target throughput performance for the TB MU UL transmission.

Example 15 includes the subject matter of any one of Examples 1-14, and optionally, wherein the expected interference-based value comprises an expected Signal to Noise Ratio (SNR) value.

Example 16 includes the subject matter of any one of Examples 1-15, and optionally, wherein the wireless communication device is an Access Point (AP).

Example 17 includes the subject matter of any one of Examples 1-16, and optionally, comprising a radio to transmit the trigger frame, and to receive the TB MU UL transmission.

Example 18 includes the subject matter of Example 17, and optionally, comprising one or more antennas connected to the radio, a memory to store data processed by the wireless communication device, and a processor to execute instructions of an operating system.

Example 19 comprises an apparatus comprising means for executing any of the described operations of Examples 1-18.

Example 20 comprises a machine readable medium that stores instructions for execution by a processor to perform any of the described operations of Examples 1-18.

Example 21 comprises an apparatus comprising: a memory interface; and processing circuitry configured to: perform any of the described operations of Examples 1-18.

Example 22 comprises a method to perform any of the described operations of Examples 1-18.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a wireless communication device to:
determine one or more transmit (Tx) configuration parameters for a wireless communication station (STA) based on a frame-related value corresponding to a frame to be communicated in an Uplink (UL) transmission from the STA as part of a Trigger-Based (TB) Multi-User (MU) UL transmission to be communicated from a plurality of STAs to the wireless communication device, wherein the frame-related value is based on at least one of a frame type of the frame or a length of the frame, wherein the apparatus is configured to cause the wireless communication device to, based on a determination that the frame comprises a control frame or a data frame, use a first frame-related value or a second frame-related value, respectively, to select the one or more Tx configuration parameters for the STA, wherein the second frame-related value is different from the first frame-related value; and
transmit a trigger frame to trigger the TB MU UL transmission, the trigger frame comprising the one or more Tx configuration parameters to configure the UL transmission from the STA.

2. The apparatus of claim 1 configured to cause the wireless communication device to determine the one or more Tx configuration parameters for the STA based on the length of the frame to be communicated in the UL transmission from the STA.

3. The apparatus of claim 1 configured to cause the wireless communication device to:
determine one or more other Tx configuration parameters for an other STA based on an other frame-related value corresponding to an other frame to be communicated in an other UL transmission from the other STA as part of the TB MU UL transmission, wherein the one or more other Tx configuration parameters for the other STA are different from the one or more Tx configuration parameters for the STA, and wherein the other frame-related value corresponding to the other frame is different from the frame-related value coresponding to the frame; and
transmit the trigger frame comprising the one or more Tx configuration parameters for the STA, and the one or more other Tx configuration parameters for the other STA.

4. The apparatus of claim 1, wherein the first frame-related value is higher than the second frame-related value.

5. The apparatus of claim 1 configured to cause the wireless communication device to, based on a determination that an other frame from an other STA of the plurality of STAs has a first frame length or a second frame length, use a first other frame-related value or a second other frame-related value, respectively, to select one or more other Tx configuration parameters for the other STA, wherein the second other frame-related value is different from the first other frame-related value.

6. The apparatus of claim 5, wherein the first frame length is longer than the second frame length, and the first other frame-related value is lower than the second other frame-related value.

7. The apparatus of claim 1, wherein the frame-related value comprises a margin value.

8. The apparatus of claim 7 configured to cause the wireless communication device to determine the one or more Tx configuration parameters based on the margin value and an interference-based value corresponding to the UL transmission from the STA.

9. The apparatus of claim 1, wherein the one or more Tx configuration parameters comprise a Modulation and Coding Scheme (MCS) for the UL transmission from the STA.

10. The apparatus of claim 1, wherein the one or more Tx configuration parameters comprise a Number of Spatial Streams (Nss) for the UL transmission from the STA.

11. The apparatus of claim 1 configured to cause the wireless communication device to determine the one or more Tx configuration parameters according to a criterion, which is based on a target reliability performance for the TB MU UL transmission and based on a target throughput performance for the TB MU UL transmission.

12. The apparatus of claim 1, wherein the wireless communication device is an Access Point (AP).

13. The apparatus of claim 1 comprising a radio to transmit the trigger frame and to receive the TB MU UL transmission; one or more antennas connected to the radio; a memory to store data processed by the wireless communication device; and a processor to execute instructions of an operating system.

14. A product comprising one or more tangible computer-readable non-transitory storage media comprising computer-executable instructions operable to, when executed by at least one processor, enable the at least one processor to cause a wireless communication device to:
   determine one or more transmit (Tx) configuration parameters for a wireless communication station (STA) based on a frame-related value corresponding to a frame to be communicated in an Uplink (UL) transmission from the STA as part of a Trigger-Based (TB) Multi-User (MU) UL transmission to be communicated from a plurality of STAs to the wireless communication device, wherein the frame-related value is based on at least one of a frame type of the frame or a length of the frame, wherein the instructions, when executed, cause the wireless communication device to, based on a determination that the frame comprises a control frame or a data frame, use a first frame-related value or a second frame-related value, respectively, to select the one or more Tx configuration parameters for the STA, wherein the second frame-related value is different from the first frame-related value; and
   transmit a trigger frame to trigger the TB MU UL transmission, the trigger frame comprising the one or more Tx configuration parameters to configure the UL transmission from the STA.

15. The product of claim 14, wherein the instructions, when executed, cause the wireless communication device to:
   determine one or more other Tx configuration parameters for an other STA based on an other frame-related value corresponding to an other frame to be communicated in an other UL transmission from the other STA as part of the TB MU UL transmission, wherein the one or more other Tx configuration parameters for the STA are different from the one or more Tx configuration parameters for the STA, and wherein the other frame-related value corresponding to the other frame is different from the frame-related value corresponding to the frame; and
   transmit the trigger frame comprising the one or more Tx configuration parameters for the STA, and the one or more other Tx configuration parameters for the other STA.

16. The product of claim 14, wherein the instructions, when executed, cause the wireless communication device to determine the one or more Tx configuration parameters for the STA based on the length of the frame to be communicated in the UL transmission from the STA.

17. The product of claim 14, wherein the first frame-related value is higher than the second frame-related value.

18. The product of claim 14, wherein the one or more Tx configuration parameters comprise a Modulation and Coding Scheme (MCS) for the UL transmission from the STA.

19. An apparatus of a wireless communication device, the apparatus comprising:
   means for determining one or more transmit (Tx) configuration parameters for a wireless communication station (STA) based on a frame-related value corresponding to a frame to be communicated in an Uplink (UL) transmission from the STA as part of a Trigger-Based (TB) Multi-User (MU) UL transmission to be communicated from a plurality of STAs to the wireless communication device, wherein the frame-related value is based on at least one of a frame type of the frame or a length of the frame, wherein the means for determining the one or more Tx configuration parameters for the STA comprises means for, based on a determination that the frame comprises a control frame or a data frame, using a first frame-related value or a second frame-related value, respectively, to select the one or more Tx configuration parameters for the STA, wherein the second frame-related value is different from the first frame-related value; and
   means for causing the wireless communication device to transmit a trigger frame to trigger the TB MU UL transmission, the trigger frame comprising the one or more Tx configuration parameters to configure the UL transmission from the STA.

20. The apparatus of claim 19, wherein the first frame-related value is higher than the second frame-related value.

* * * * *